H. EDDY.
Bee Hive.
No. 11,691. Patented Sept. 19, 1854.
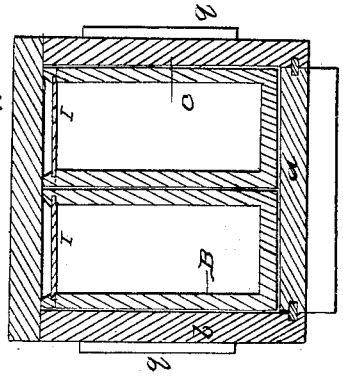
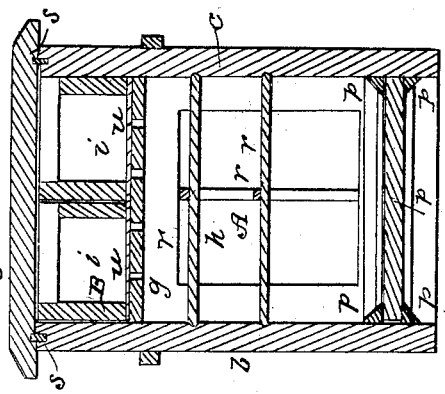
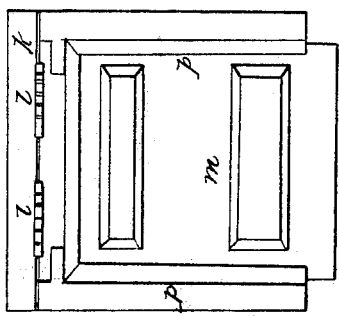
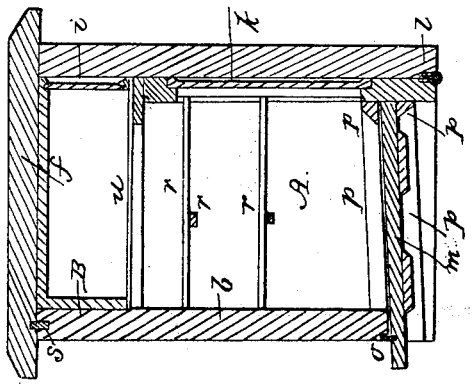
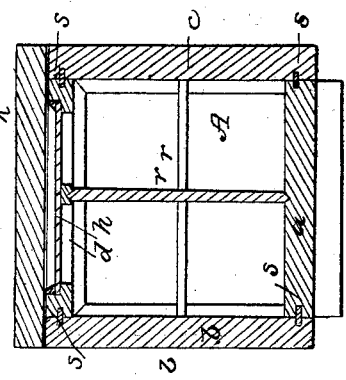
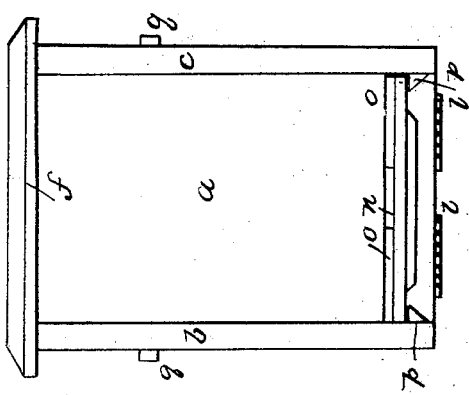

UNITED STATES PATENT OFFICE.

HENRY EDDY, OF NORTH BRIDGEWATER, MASSACHUSETTS.

BEEHIVE.

Specification of Letters Patent No. 11,691, dated September 19, 1854.

*To all whom it may concern:*

Be it known that I, HENRY EDDY, M. D., of North Bridgewater, in the county of Plymouth and State of Massachusetts, have invented a new and useful Improvement in the Beehive; and I do hereby declare that the same is fully described and represented in the following specification and the accompanying drawings, letters, figures, and references thereof.

Of the said drawings, Figure 1, denotes a front elevation; Fig. 2, a vertical and longitudinal section; Fig. 3, a horizontal section; Fig. 4, a vertical and transverse section; and Fig. 5, an underside view of my improved hive.

The particular object I have had in view in the above-named improvement is to protect the bees from the encroachment of the bee moth, and for this purpose, the principle on which I proceed is, to so construct the hive as not only to intercept or imprison the animal heat naturally emanating from the bees and prevent such from escaping or passing through any joint or crevice where the eggs of the bee-mouth may be deposited, but also to so construct the hive as to prevent the ingress or passage of the bee-moth into it by any of its joints.

In carrying out my invention, I make use of no cage, trap, or lodging place for the miller, as have been commonly employed. When my hive is in good condition, the miller is provided with no quarters or hiding place whatever. Ordinarily it deposits its eggs in the joints or cavities, or around the bottom of a hive when they are hatched by the animal heat proceeding from the bees, and passing into such crevices or places and getting access to the eggs therein. My improved hive is also so constructed that should the miller enter by passing through the bee entrance (which is of very rare occurrence, as this generally is guarded by the bees) I can have such perfect command of the slide or bottom of the hive, that every egg or moth found deposited upon it can readily be removed.

I have discovered that the millers do not and will not deposit their eggs upon a composition of white oxid of lead and linseed or other proper drying oil, or common white lead paint. This article, I use for a double or twofold purpose, viz, not only to aid in intercepting and imprisoning the animal heat of the bees or in offering an obstruction to its passage into or through the joints of the hive, but to furnish a surface or material upon which the miller has a great aversion to, or one on which it will not deposit its eggs. It should also be observed that my improvement has reference particularly to hives constructed of wooden boards or pieces of wood, which of necessity are obliged to have joints, and I do not confine my invention to a hive as formed square or rectangular in its horizontal section or which may be cubical or prismoidal in shape; as my improvement is equally well adapted to hives of other forms, and which may be constructed of parts or pieces connected together.

The hive represented in the drawing consists in part, of a quadrangular prismoidal box, which constitutes its external case, such box being formed of four sides or boards, $a$, $b$, $c$, $d$, united together and covered by a top, roof, or cap $f$. This box is divided by a horizontal partition into two chambers, A, and B, the lower of which constitutes the main chamber or portion of the hive, while the upper chamber is for the purpose of receiving two or any other suitable number of sliding honey boxes, or inferior hive chambers such as are common to most bee hives. The rear upright face $d$, of the main chamber of the hive as well as the rear end of each of the honey boxes, is provided with a pane of glass, $h$, or $i$, $i$, (see Fig. 6, which denotes a horizontal section of the hive taken through the honey boxes), the object of such being to enable a person to look through them at any time and into either chamber for the purpose of examining its contents while inhabited by bees.

To the rear side of the hive, a door, $k$, is applied, it being made to turn on hinges as seen at $l$, and to completely inclose and cover up the panes of glass and the entire surface of the rear side of the hive. The bottom of the hive is seen at $m$, and the bee entrance at $n$. This bottom is made to project somewhat beyond the front of the hive and is provided with two tin or metallic protectors seen at $o$, $o$, they being made to flank the bee entrance and to rise above the top surface of the bottom of the hive and to bear close against the front side of the hive when the bottom is closed or forced entirely inward. These protectors consist of sheets of metal or other proper material fitted closely into grooves formed in the bottom of the hives. The said bottom of the hive is made to slide and fit on its two sides and one end into a groove formed in the three adjacent sides of the hive, or made by means of two sets of cleats, $p$, $p$, closely attached to the inner surfaces of the three sides of a hive, the same being shown in the drawings. There are cleats $q$, $q$, attached to the outer surfaces of the two opposite sides of the hive. To these cleats may be attached any suitable contrivance for suspending the hive in the air.

The main chamber of the hive is provided with comb supporters or bars $r$, $r$, $r$, which are made to extend across one another at right angles or in any other proper manner to opposite sides of the hive.

The lower set of cleats, which serve to support the bottom of the hive may be arranged a little out of parallelism with the upper set so as to cause the movable slide or bottom to be easily slid into or out of place and make a close joint between its top surface and its top cleats when the slide is forced home or up against the rear side of the hive. Each of the joints of the hive into or through which the animal heat of the bees would be likely to pass, is to be provided with a tongue, $s$, which is to be inserted into a corresponding groove or grooves formed in and below the surfaces of the two parts or sides of the hive which are in contact. The tongue thus being made to extend across the surfaces and to fit closely into the grooves so as to intercept the passage of the animal heat between said surfaces. Before these tongues are inserted in the grooves, they are to be well covered with white lead paint or the joints or surfaces of the parts of the hive that are to come in contact are to be well paved or covered with the white lead paint previous to the insertion of the tongue in the groove or grooves.

The two tin protectors on the opposite sides of the bee entrance serve to prevent the escape of animal heat from the hive. The honey boxes are made to rest respectively on tin slides, $u$, $u$, which when in place serve to intercept the communication between the honey boxes and main apartments or chambers underneath them.

A hive so constructed is not intended to rest on any bench, boards, planks or timbers whatsoever, that may furnish a lodging place for the miller to secrete himself; nor is it intended to have any connection whatever with a bee house, nor to be hung up by any string, chain, or other contrivance which has any supporting attachment placed above the hive; but said hive is intended to be supported in the open air and shade by lateral supporters disconnected, as far as may be, from all boards, buildings, fences, or other contrivances, which from their proximity to the hive might be injurious in any respect. Before applying the sleats, $p$, $p$, in place, they may have the white lead paint applied to the surfaces of them which are to be placed in contact with the sides of the hive. The advantages peculiar to my improved hive may be stated as follows, viz, By the use of a movable slide or bottom all excrement, filth and dead bees can be easily removed from the hive when occasion may require. The same admits of the ventilation of the hive so as to prevent the bees from clustering on the outside of the hive in warm weather. It admits the bottom of the hive to be inspected in order to ascertain its condition, or that of the comb.

The manner of sustaining the slide causes the animal heat of the bees, to a great extent, to be intercepted or prevented from passing through the joints or sides thereof, thus preventing the hatching of such eggs of the miller as may be lying in or near such joints.

The method of connecting the other parts of the hive, viz, by tongues and grooves, and by the application of white lead paint thereto in the manner set forth, not only causes the animal heat to be intercepted or imprisoned within the hive, but presents an obstacle to the laying of the eggs within the joints, and the entrance of the moth into the hive by passing through the joints, and particularly should the wood become contracted by changes of temperature so as to cause the joints to be opened more or less.

I claim nothing original in dividing the hive into upper and lower apartments; nor the insertion of panes of glass in the sides of such apartments; but

What I claim as my improvement and for which I desire to secure Letters Patent is—

The arrangement of metallic protectors in a movable slide or bottom substantially as described and for the purposes already set forth.

In testimony whereof, I have hereto set my signature this ninth day of November, A. D. 1853.

HENRY EDDY.

Witnesses:
GEO. W. BRYANT,
A. A. GILMORE.